US010890226B2

(12) United States Patent
Kienleitner et al.

(10) Patent No.: US 10,890,226 B2
(45) Date of Patent: Jan. 12, 2021

(54) FIBER FOR TRIBOLOGICAL APPLICATIONS

(71) Applicant: Tribotecc GmbH, Arnoldstein (AT)

(72) Inventors: Herbert Kienleitner, Arnoldstein (AT); Carmen Moser, Villach (AT); Juergen Bartlmae, Noetsch im Gailtal (AT); Lorraine Segreto, Villach (AT); Rudolf Schrittesser, Villach (AT); Peter Faullant, Ossiach (AT); Christian Schmied, St. Veit/Glan (AT)

(73) Assignee: Tribotecc GmbH, Vienna (AU)

( * ) Notice: Subject to any disclaimer, the term of this patent is extended or adjusted under 35 U.S.C. 154(b) by 166 days.

(21) Appl. No.: 15/769,694

(22) PCT Filed: Oct. 19, 2016

(86) PCT No.: PCT/EP2016/075122
§ 371 (c)(1),
(2) Date: Apr. 19, 2018

(87) PCT Pub. No.: WO2017/068002
PCT Pub. Date: Apr. 27, 2017

(65) Prior Publication Data
US 2018/0306263 A1    Oct. 25, 2018

(30) Foreign Application Priority Data

Oct. 20, 2015 (AT) .................. A 682/2015

(51) Int. Cl.
| | | |
|---|---|---|
| *F16D 69/02* | (2006.01) | |
| *C03C 25/42* | (2006.01) | |
| *D01F 9/08* | (2006.01) | |
| *C23C 18/12* | (2006.01) | |
| *D06M 11/53* | (2006.01) | |
| *C03C 14/00* | (2006.01) | |
| *F16D 69/00* | (2006.01) | |
| *C03C 13/06* | (2006.01) | |
| *D01F 6/60* | (2006.01) | |
| *D06M 11/51* | (2006.01) | |
| *D06M 101/36* | (2006.01) | |
| *B22D 11/00* | (2006.01) | |

(52) U.S. Cl.
CPC ............ *F16D 69/026* (2013.01); *C03C 13/06* (2013.01); *C03C 14/00* (2013.01); *C03C 25/42* (2013.01); *C23C 18/1204* (2013.01); *D01F 6/605* (2013.01); *D01F 9/08* (2013.01); *D06M 11/51* (2013.01); *D06M 11/53* (2013.01); *F16D 69/00* (2013.01); *F16D 69/02* (2013.01); *B22D 11/005* (2013.01); *D06M 2101/36* (2013.01); *D06M 2200/40* (2013.01); *F16D 2200/0065* (2013.01); *F16D 2200/0073* (2013.01); *F16D 2250/00* (2013.01); *F16D 2250/0023* (2013.01); *F16D 2250/0046* (2013.01)

(58) Field of Classification Search
CPC ......... C03C 25/42; C03C 14/00; C03C 13/06; F16D 69/02; D06M 11/53; D06M 11/51; D01F 9/08; D01F 6/605
USPC ....................................................... 523/156
See application file for complete search history.

(56) References Cited

U.S. PATENT DOCUMENTS

| | | | |
|---|---|---|---|
| 3,372,051 A | | 3/1968 | Stalego |
| 4,267,476 A | * | 5/1981 | Lee ..................... H01R 39/22 310/248 |
| 2011/0200819 A1 | | 8/2011 | Baba et al. |

FOREIGN PATENT DOCUMENTS

| | | |
|---|---|---|
| DE | 3718171 A1 | 12/1988 |
| DE | 19861035 A1 | 10/1999 |
| EP | 2944843 A1 | 11/2015 |
| JP | 53-68685 A | 6/1978 |
| JP | 59-24775 A | 2/1984 |
| JP | 59-24777 A | 2/1984 |
| JP | 63-231026 A | 9/1988 |
| JP | 1108428 A | 4/1989 |
| JP | 01238927 A | 9/1989 |
| JP | 0539365 A | 2/1993 |
| JP | 2000-204351 A | 7/2000 |
| JP | 2001-302286 | * 10/2001 |
| JP | 2001-302286 A | 10/2001 |
| JP | 2008-274193 A | 11/2008 |
| JP | 2010-120992 A | 6/2010 |
| JP | 2013-158473 A | 8/2013 |
| WO | WO95/02564 A1 | 1/1995 |
| WO | 2014-026998 A | 2/2014 |

OTHER PUBLICATIONS

Machine translation of JP 2001-302286 (Year: 2001).*
Search Reported dated Nov. 9, 2015 (corresponding Austrian Appl. No. 682/2015.
Search Reported dated Jul. 25, 2016 (corresponding Austrian Appl. No. 682/2015).

* cited by examiner

*Primary Examiner* — Doris L Lee
(74) *Attorney, Agent, or Firm* — Faegre Drinker Biddle & Reath LLP

(57) ABSTRACT

Fiber for tribological applications, with the exception of mineral fibers, comprising at least one solid lubricant, with the exception of graphite, or boated with at least one solid lubricant, with the exception of graphite.

8 Claims, 1 Drawing Sheet

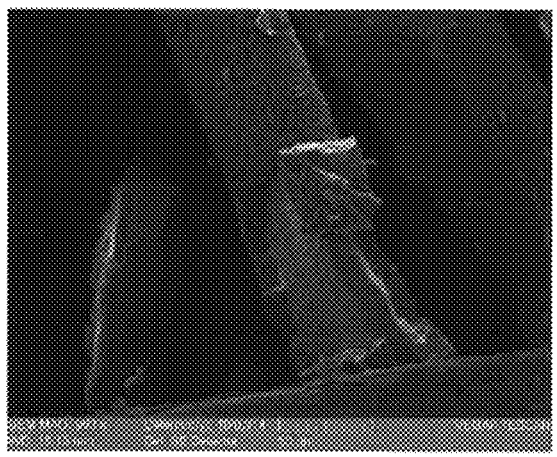

FIBER FOR TRIBOLOGICAL APPLICATIONS

The invention relates to a fiber for tribological applications.

In this context, a fiber generally will be understood as a construct having a thin body in relation to its length.

Fibers, such as metal, ceramic, natural, polymeric fibers, or the like, are a very important functional element in many components, e.g., in friction linings. Due to the fibers' structure, they substantially contribute to mechanical and structural strength, and prevent so-called "hotspots" through good thermal conductivity. In general, fibers can be classified as synthetic fibers, natural fibers as well as recycled fibers from natural and/or synthetic products.

Tribological contacts between a brake disk and its frictional lining predominantly form at the interfaces of the metallic fibers employed. According to the contact-plateau theory, contact plateaus are formed on the surface of brake linings, which protrude from the rest of the lining surface. The actual contact between the friction pair occurs within this contact plateau, which is why the size and composition of such plateaus heavily influence a lining's frictional performance. Here, a distinction is made between primary contact plateaus formed by wear-resistant, harder elements, e.g., fibers or abrasion particles, and secondary plateaus consisting of compressed particles of wear accumulating in front of said primary plateaus and being compressed there.

The use of solid lubricants, e.g., graphite and/or metal sulfide, is considered state of the art in many applications. Solid lubricants in general, and particularly metal sulfide, are used to improve tribological characteristics, including in applications for friction linings, triboplastics, liquid and paste-like lubricants, anti-friction coatings, abrasive bodies, and sintered components. Metal sulfides can achieve reduced wear effects of friction partners, stabilize and modify friction values, and are employed as convenient additives against undesired effects. Undesired effects include picking, scratching, stick-slip phenomena, as well as high and low frequency tribosystem vibrations.

The inventors have found that admixed solid lubricants migrate away from the contact plateaus, e.g., in friction linings, and will only be available in a low extent for the actual contact between friction partners already after short operating times and could therefore only show reduced effectiveness in tribological applications.

It is the object of the invention to provide a fiber allowing for an improvement of tribological component characteristics.

According to the invention, this will be achieved in that the fiber, except for mineral fibers, comprises at least one solid lubricant, excluding graphite, or in that the fiber is surface-treated, particularly coated, preferably sulfidized, with at least one solid lubricant, excluding graphite.

Various methods for sulfidizing comply with the state of the art.

At that, the solid lubricant can either be formed on the fiber surface only, or can be disposed on the fiber surface, or partially or wholly comprises the fiber itself.

By forming fibers according to a method of the invention, superficially or wholly consisting of solid lubricants or being coated therewith, solid lubricants can be provided close to tribological contact plateaus in a direct and targeted manner, which exist within or around primary contact plateaus formed by structuring fibers, and can be maintained within the tribological contact plateau area, as fibrous solid lubricants cannot, or only with considerable difficulty, migrate off while being present in composite fiber structures.

US 2015/0204403 A1 describes a graphite-coated fiber used for improving thermal conductivity. Due to the following reasons, however, graphite may not be used as solid lubricant for this invention.

Contrary to widespread beliefs, the lubricating effect of graphite is no intrinsic characteristic, but is dependent on the presence of vapors or small molecules, such as water. In vacuo or in dry conditions, graphite loses its lubricating effects. In dry conditions with temperatures of more than 160° C., moisture starts to evaporate and the lubricating effect of graphite decreases. Especially in applications for brake linings however, constant friction values across a very wide temperature range are essential. Within the contact zone between brake lining and brake disk, momentary temperatures of more than 800° C. can also be reached. Therefore, only solid lubricants other than graphite may be used for producing a fiber for improving tribological characteristics within the scope of this invention. Using solid lubricants, excluding graphite, for improving tribological characteristics is a decisive aspect of the invention.

The fiber according to the invention may be produced using two different processes, specifically via surface treatment of fibers, chemical or physical application of solid lubricants, with or without binding agents, and via the production of fibers containing at least one solid lubricant.

It has been shown that mineral fibers are not suitable for applications according to the invention, therefore they will be excluded from the scope of this specification.

Suitable fibers therefore include, e.g., cellulose fibers, aramid fibers, plastic fibers, metal fibers, glass fibers, nanofibers, carbon fibers, with the exception of mineral fibers. In other embodiments of the invention, methods for directly producing fibers from solid lubricants comprise laser sintering, melt extraction, machined fiber production, section rolling, as well as spinning processes, etc.

Depending on the field of application, the fiber according to the invention may vary in length or diameter, without limitation.

In another embodiment, the solid lubricant forming the fiber according to the invention or coated thereon may be formed from at least one metal sulfide.

According to another embodiment of the invention, it has been found that in order to be able to achieve an effective tribological effect with said fiber, the percentage of the at least one solid lubricant is at least 3% by weight, preferably at least 4% by weight, especially at least 5% by weight, and most preferably at least 10% by weight.

According to an embodiment of the invention, the fiber may be sulfidized so that, e.g., a metal sulfide is formed on the surface of the fiber acting as solid lubricant.

Another example of an embodiment of the invention may consist of a fiber which is an iron sulfide fiber or a tin-iron sulfide fiber.

In further developments of the invention, the solid lubricant for producing the fiber according to the invention may be provided as a multi-phased metal sulfide.

According to another embodiment of the invention, the solid lubricant for producing the fiber according to the invention may be formed of $SnS$, $SnS_2$, $MOS_2$, $Bi_2S_3$, $ZnS$, $WS_2$, $CuFeS_2$, $FeS$, $CuS$, $Cu_2S$, $MnS$, $Sb_2S_3$, $TiS_2$, sulfides of Cr/Co/Ni, $Sn_2S_3$, $MoS_3$, $WS_3$, $Fe_{1-x}S$, $MnS_2$, $Sb_2S_5$, $ZrS_2$, $CaS$, $MgS$, sulfides of La, Ce, and multi-phased sulfides of various metals, BN, PTFE, phosphates, oxides, or mixtures thereof, without being limited to the above.

Without limitation, one of the preferred applications for fibers according to the invention is the industry for producing friction linings, specifically the usage in various friction lining types: linings for disk and drum brakes, clutch linings, as well as other brake linings, particularly industrial linings, but also wind power plant brake linings which may be bound to artificial resins as well as sintered or otherwise attached. The field of application of the invention includes all formulation types, such as low-met, NAO, sintered, semi-met, hybrid, and others.

Further applications in which fibers are used, and in which tribology plays an important role along with structural aspects, are also possible within the scope of the invention. For example, one other field of application may be the plastics industry, specifically the triboplastics sector. Accordingly, these may contain the fiber according to the invention.

Furthermore, the invention relates to a friction lining mixture comprising a fiber according to the invention.

The friction lining mixture according to the invention combines the application-specific benefits of solid lubricants, e.g., of metal sulfides, and fibers. In order to substitute copper, e.g., in brake linings, it is essential to combine various benefits in order to imitate the properties of copper when applying it to friction linings. By using solid composite lubricants, structuring and, at the same time, lubricating fibers in this case, a sustainable improvement of tribological characteristics is achieved.

According to the "contact-plateau theory", a solid lubricant fiber or a fibrous solid lubricant, respectively, according to the invention offers very good characteristics for improving all aspects of friction linings.

Further, it may be envisioned that the filler of the friction lining mixture according to the invention is formed of one or more of barium sulfate, calcium carbonate, calcium hydroxide, calcium fluoride, iron oxide, silica, vermiculite, magnesium oxide, talc, zirconium silicate, zirconium oxide, mica, metal powder, molybdenum oxide, alumina, other metal oxides, silicon carbide, wollastonite, potassium titanate, chromite, calcium sulfate-whiskers, pet coke, rubber dust, nitrile rubber, acrylic rubber, friction dust.

Further, the invention relates to a brake or clutch lining consisting of a bonded friction lining mixture according to the invention.

EXAMPLES

Here, exemplary application-specific results of various sulfidized fibers are shown compared to each of the similar, but non-sulfidized fibers (blank) in brake linings.

The sulfidized fibers were incorporated into a common low-met formulation, and brake linings were crimped. Application-specific lining characteristics were tested using the AK-Master test according to the SAE J2522 on a dynamometer. The inertia used is listed in the results that are given below. The braking system used was a Golf I type system.

TABLE 1

AK-Master test results in coppery low-met formulation. Braking system: Golf 1, inertia: 60 kg m$^2$

| Results (Cu-containing formulation, Inertia: 60 kg m$^2$) | Wear lining [g] | Improvement [%] | Average friction value µ | Improvement [%] | Fade 2 friction value 100->5 km/h | Improvement [%] |
|---|---|---|---|---|---|---|
| Blank | 13.3 | | 0.33 | | 0.24 | |
| Sulfidized steel fiber; trial 1 | 10.6 | 20 | 0.33 | 0 | 0.28 | 17 |
| Sulfidized steel fiber; trial 2 | 12.2 | 8 | 0.34 | 3 | 0.30 | 25 |
| Sulfidized steel fiber; trial 3 | 8.4 | 37 | 0.35 | 6 | 0.27 | 13 |
| Sulfidized steel fiber; trial 4 | 8.3 | 38 | 0.36 | 9 | 0.29 | 21 |
| Blank | 14.9 | | 0.32 | | 0.28 | |
| Sulfidized stainless steel fiber, trial 1 | 11.5 | 23 | 0.33 | 3 | 0.30 | 7 |
| Sulfidized stainless steel fiber, trial 2 | 12.1 | 19 | 0.33 | 3 | 0.28 | 0 |
| Blank | 13.3 | | 0.33 | | 0.24 | |
| Sulfidized rock wool, trial 1 | 11.6 | 13 | 0.33 | 0 | 0.28 | 17 |
| Sulfidized rock wool, trial 2 | 9.0 | 32 | 0.34 | 3 | 0.28 | 17 |
| Blank | 17.4 | | 0.33 | | 0.21 | |
| Sulfidized glass fiber, trial 1 | 8.8 | 49 | 0.35 | 6 | 0.30 | 43 |
| Sulfidized glass fiber, trial 2 | 13.2 | 24 | 0.33 | 0 | 0.30 | 43 |
| Blank | 13.3 | | 0.33 | | 0.24 | |
| Sulfidized aramid fiber, trial 1 | 11.7 | 12 | 0.36 | 9 | 0.28 | 17 |
| Sulfidized aramid fiber trial 2 | 13.1 | 2 | 0.34 | 3 | 0.31 | 29 |

In table 1, improvements for areas such as lining wear and average friction value as well as for the minimal friction value from the AK-Master block "Fade 2" are shown. Across the exemplary testing series, improvements in lining wear of up to 49% could be achieved, compared to the corresponding blank, for the average friction value acc. to the AK-Master test, an improvement of up to 9% could be achieved, and for the minimal friction value, an improvement of up to 43% could be seen.

The tests were repeated in a copper-free base mixture. In this formulation, improvements in lining wear of up to 29%, an increase of friction value of up to 13%, and an improvement of Fading 2 of up to 43% could be achieved.

The results are shown in the table below.

TABLE 2

AK-Master test results in Cu-free low-met formulation. Braking system: Golf 1, inertia: 40.6 kg m²

| Results (Cu-free formulation, Inertia: 40.6 kg m²) | Wear lining [g] | Improvement [%] | Average friction value μ | Improvement [%] | Fade 2 friction value 100->5 km/h | Improvement [%] |
|---|---|---|---|---|---|---|
| Blank | 7.0 | | 0.31 | | 0.24 | |
| Sulfidized steel fiber; trial 1 | 6.5 | 7 | 0.32 | 3 | 0.28 | 17 |
| Sulfidized steel fiber; trial 2 | 6.2 | 11 | 0.33 | 6 | 0.30 | 25 |
| Sulfidized steel fiber; trial 3 | 6.5 | 7 | 0.33 | 6 | 0.25 | 4 |
| Sulfidized steel fiber; trial 4 | 6.3 | 10 | 0.34 | 10 | 0.24 | 0 |
| Blank | 6.9 | | 0.32 | | 0.28 | |
| Sulfidized stainless steel fiber, trial 1 | 6.4 | 7 | 0.33 | 3 | 0.30 | 7 |
| Sulfidized stainless steel fiber, trial 2 | 6.3 | 9 | 0.33 | 3 | 0.28 | 0 |
| Blank | 7.0 | | 0.31 | | 0.24 | |
| Sulfidized rock wool, trial 1 | 5.7 | 19 | 0.32 | 3 | 0.28 | 17 |
| Sulfidized rock wool, trial 2 | 5.9 | 16 | 0.31 | 0 | 0.28 | 17 |
| Blank | 6.6 | | 0.33 | | 0.21 | |
| Sulfidized glass fiber, trial 1 | 4.7 | 29 | 0.35 | 6 | 0.30 | 43 |
| Sulfidized glass fiber, trial 2 | 5.7 | 14 | 0.33 | 0 | 0.30 | 43 |
| Blank | 7.0 | | 0.31 | | 0.24 | |
| Sulfidized aramid fiber, trial 1 | 5.9 | 16 | 0.35 | 13 | 0.28 | 17 |
| Sulfidized aramid fiber trial 2 | 5.5 | 21 | 0.34 | 10 | 0.31 | 29 |

The friction lining formulations for testing the benefits of the functional fiber are shown below. In the application-specific comparison, steel fibers and stainless steel fibers and rock wool or aramid fibers, respectively, were each replaced by the corresponding sulfidized type.

Formulation, Cu-Containing [% by Weight]
Binder 6
Organic fillers 7
Aramid fiber 3
Rock wool 7
Steel fibers/Stainless steel fibers 11
Copper/brass 16
Inorganic fillers 27
Abrasive agents 10
Graphite/Coke 13
Formulation, Cu-free [% by weight]
Binder 6
Organic fillers 8
Aramid fibers 4
Rock wool 8
Steel fibers/Stainless steel fibers 13
Inorganic fillers 32
Abrasive agents 12
Graphite/Coke 17

FIG. 1 shows an example of a sulfidized steel fiber.

The steel fibers which were used have the following characteristics; Fiber length: min. 100 μm; max. 2000 μm; average: 900 μm Fiber diameter: min. 20 μm; max. 100 μm; average: 50 μm Sulfide concentration in sulfidized steel fibers:

| Description | SnS [wt %] | FeS [wt %] | MoS$_2$ [wt %] |
|---|---|---|---|
| Steel fiber trial 1 | 7 | 35 | — |
| Steel fiber trial 2 | 10 | 10 | — |
| Steel fiber trial 3 | — | 35 | 7 |
| Steel fiber trial 4 | — | 10 | 10 |
| Stainless steel fiber trial 1 | 7 | 35 | — |
| Stainless steel fiber trial 2 | 10 | 10 | — |

Summary of various materials which could possibly be used in the friction lining formulation (individual group summary):

Examples of binders: thermosetting polymer, typically phenol resin or melamine resin, epoxy resin, modified phenol resins, synthetic rubber.

Examples of fillers: barium sulfate, calcium carbonate, calcium hydroxide, calcium fluoride, iron oxide, silica, vermiculite, magnesium oxide, talc, zirconium silicate, zirconium oxide, mica, metal powder, molybdenum oxide, alumina, other metal oxides, silicon carbide, wollastonite, potassium titanate, chromite, calcium sulfate-whiskers, pet coke, rubber dust, nitrile rubber, acrylic rubber, friction dust.

Exemplary use of friction linings:

Friction linings, e.g., disk brake linings, serve to slow moving objects, e.g., vehicles (cars). To achieve this, a friction lining is pressed against a moving counterbody with as much of its surface area as possible, and the counterbody is slowed down/braked in relation to the friction lining by the arising friction. Typically, this process leads to abrasion (wear) and frictional heat.

Further examples of fibers of the invention are provided as follows;

Solid lubricant surface concentration of coated steel fibers:

| Description | SnS [wt %] | FeS [wt %] | CaF$_2$ [wt %] |
|---|---|---|---|
| Steel fiber trial 5 | 5 | 30 | 7 |
| Steel fiber trial 6 | 10 | 10 | 10 |
| Stainless steel fiber trial 3 | 5 | 30 | 7 |
| Stainless steel fiber trial 4 | 10 | 10 | 10 |

Summary of sulfides comprised in metal sulfide fibers:

| Description | CuS [wt %] | SnS [wt %] | FeS [wt %] | MoS$_2$ [wt %] |
|---|---|---|---|---|
| Solid fiber 1 | — | 20 | 80 | — |
| Solid fiber 2 | 6.5 | 13.5 | 80 | — |
| Solid fiber 3 | — | 13.5 | 80 | 6.5 |

Solid lubricant fibers:

Direct production, e.g., through melt spinning processes, for solid lubricants, e.g., metal sulfides or multi-phased metal sulfides from a melt which was specifically produced for this purpose. One example of this would be a SnS fiber. For friction linings, the entire fiber content or a fraction of the produced fiber, respectively, will be used.

It was shown during implementation that the solid lubricant, bound to the fiber or comprising same, respectively, is distributed differently within the friction lining, meaning that it could be placed at another site where it would be needed, and thus supports tribological contact and shows its benefits of minimizing wear and stabilizing frictional values. Furthermore, the fiber-bound solid lubricant within the friction lining mixture can no longer sediment before pressing and after pre-mixing, and will continue to be present in a homogenous distribution even within the finished composite.

It has been shown that the invention also provides an ecological benefit in that the amount of non-ferrous metal, especially copper, in friction linings is reduced, which would otherwise be disseminated into the environment and have ecotoxic effects on same, through the resulting wear of the lining.

The invention claimed is:

1. A fiber for tribological applications wherein said fiber is surface-treated with at least one solid lubricant,
   said fiber being a metal fiber, a ceramic fiber, a natural fiber, a polymeric fiber, a cellulose fiber, an aramid fiber, a plastic fiber, a glass fiber, a nanofiber, or a carbon fiber, and
   the solid lubricant being formed of one or more of SnS, $SnS_2$, $MoS_2$, $Bi_2S_3$, ZnS, $WS_2$, $CuFeS_2$, FeS, CuS, $Cu_2S$, MnS, $Sb_2S_3$, $TiS_2$, sulfides of Cr/Co/Ni, $Sn_2S_3$, $MoS_3$, $WS_3$, $Fe_{1-x}S$, $MnS_2$, $Sb_2S_5$, $ZrS_2$, CaS, MgS, sulfides of La, multi-phased metal sulfides, or mixtures thereof;
   wherein said solid lubricant is chemically bound to said fiber through sulfidization;
   wherein the amount of the at least one solid lubricant is at least 3% by weight.

2. The fiber according to claim 1, wherein said coated fiber is one of natural origin, or is synthetically produced, or is obtained through recycling of natural and/or synthetic products.

3. The fiber according to claim 1, wherein said fiber comprises metal sulfide.

4. The fiber according to claim 1, wherein said fiber comprising a solid lubricant is produced by laser sintering, melting extraction, machined fiber production, section rolling or spinning methods.

5. The fiber according to claim 1, wherein the one or more of the solid lubricants are in the form of multi-phased metal sulfides.

6. The fiber according to claim 1, wherein the amount of the at least one solid lubricant is at least 10% by weight.

7. A friction lining mixture having at least one fiber according to claim 1.

8. The friction lining mixture according to claim 7, further comprising a filler formed of one or more of barium sulfate, calcium carbonate, calcium hydroxide, calcium fluoride, iron oxide, silica, vermiculite, magnesium oxide, talc, zirconium silicate, zirconium oxide, mica, metal powder, molybdenum oxide, alumina, other metal oxides, silicon carbide, wollastonite, potassium titanate, chromite, calcium sulfate-whiskers, pet coke, rubber dust, nitrile rubber, acrylic rubber, friction dust.

* * * * *